Oct. 9, 1956      G. G. LANDIS ET AL      2,766,360
FLUX HOPPER ARRANGEMENT FOR SUBMERGED ARC WELDING
Filed July 16, 1953      3 Sheets-Sheet 1
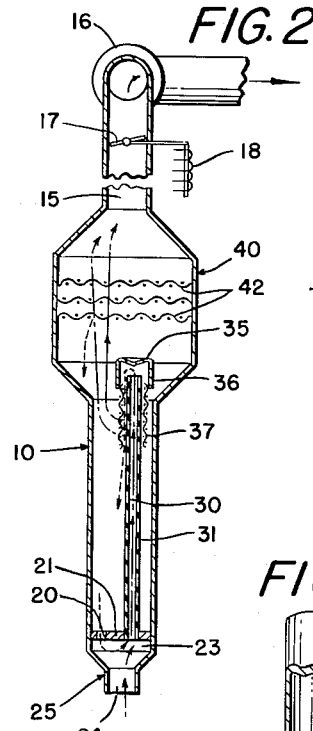
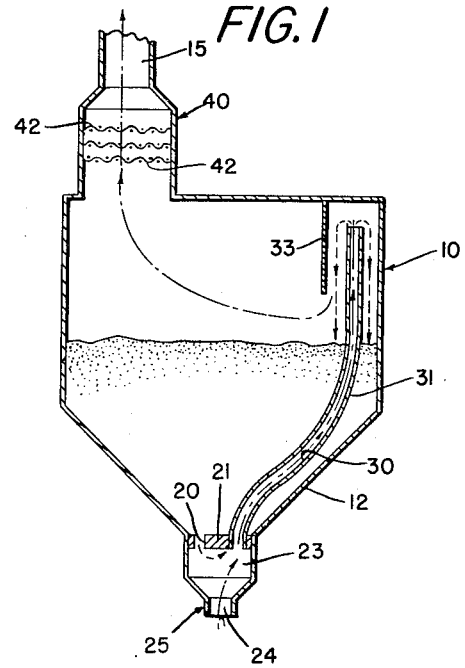
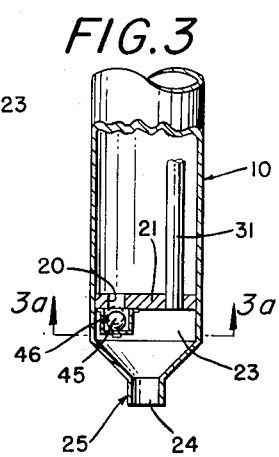
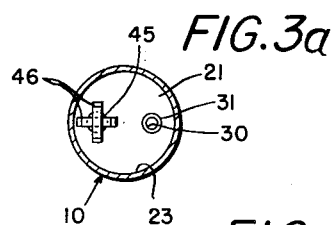
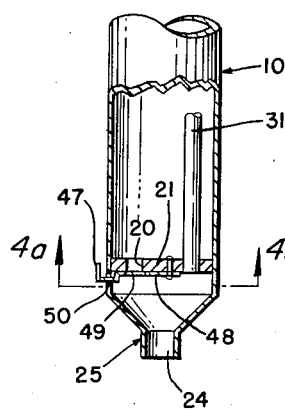
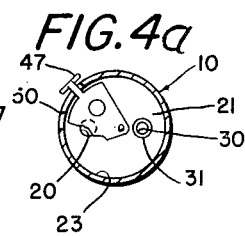
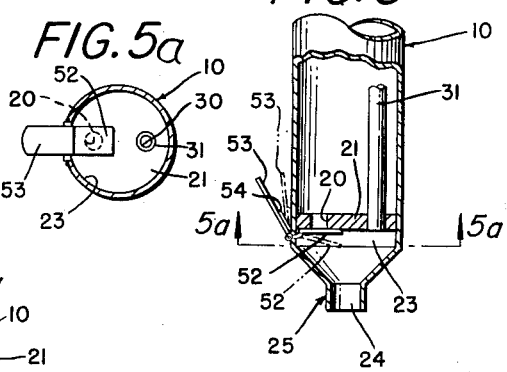
INVENTORS
GEORGE G. LANDIS &
HAROLD S. PAYNE
BY
Alfred C. Body
ATTORNEY Oct. 9, 1956    G. G. LANDIS ET AL    2,766,360
FLUX HOPPER ARRANGEMENT FOR SUBMERGED ARC WELDING
Filed July 16, 1953    3 Sheets-Sheet 2
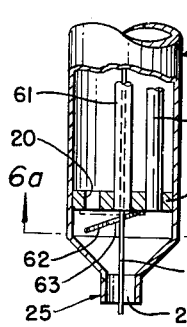
FIG. 6
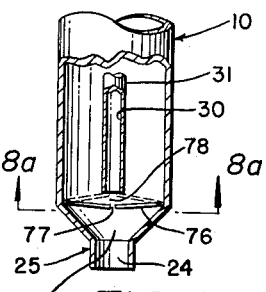
FIG. 6a  FIG. 7  FIG. 8
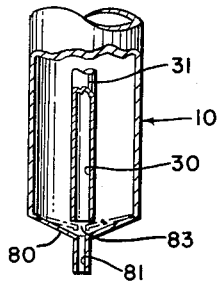
FIG. 7a
FIG. 8a
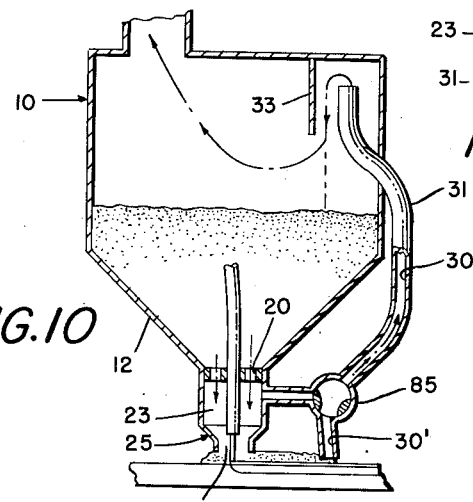
FIG. 9    FIG. 10
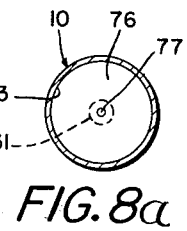
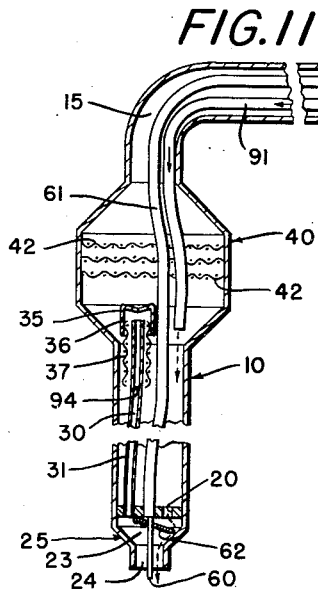
FIG. 11
INVENTORS
GEORGE G. LANDIS &
BY  HAROLD S. PAYNE
Alfred C. Brody
ATTORNEY Oct. 9, 1956     G. G. LANDIS ET AL     2,766,360
FLUX HOPPER ARRANGEMENT FOR SUBMERGED ARC WELDING
Filed July 16, 1953     3 Sheets-Sheet 3
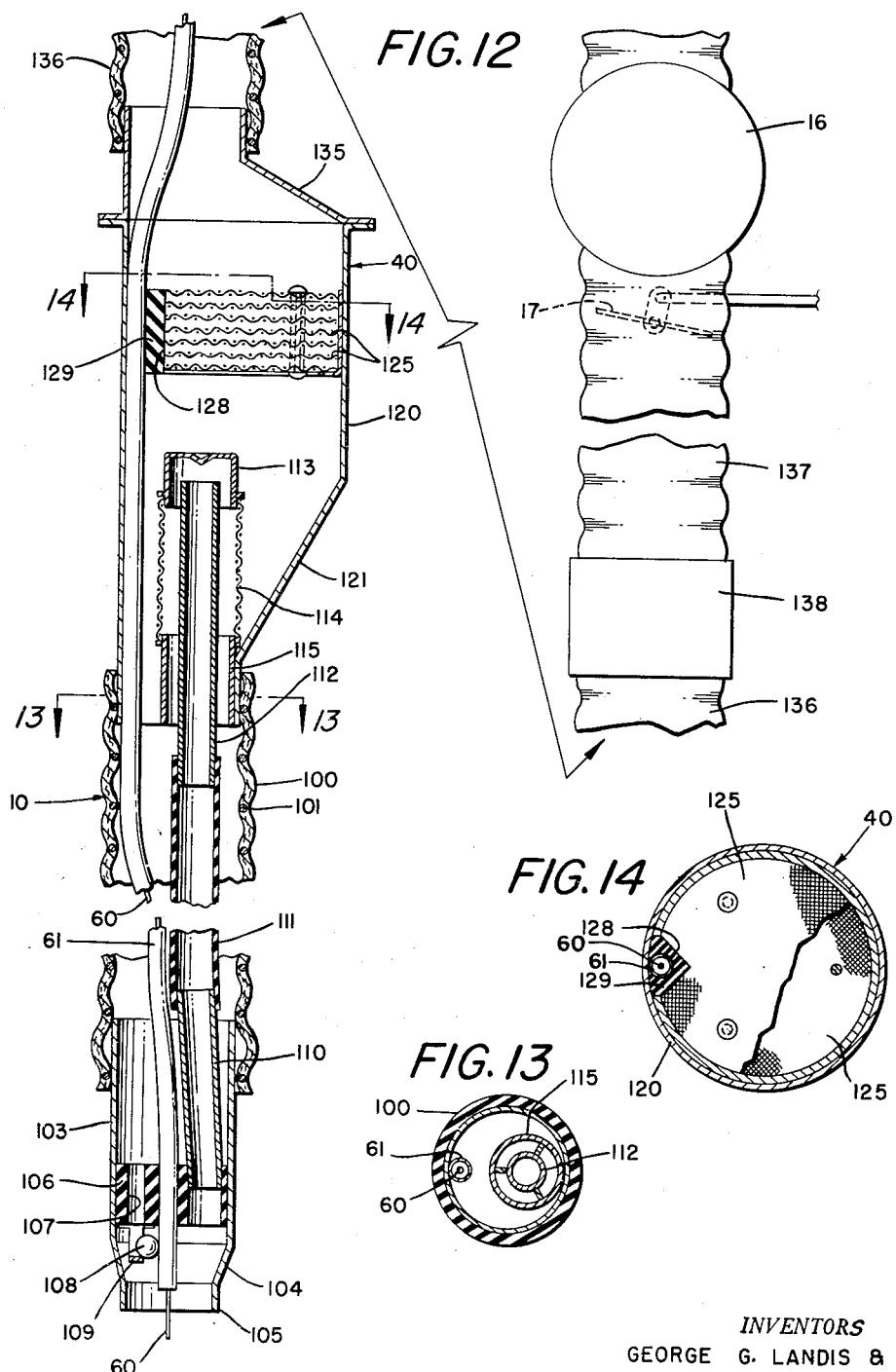
INVENTORS
GEORGE G. LANDIS &
BY HAROLD S. PAYNE
ATTORNEY

United States Patent Office 2,766,360
Patented Oct. 9, 1956

2,766,360

FLUX HOPPER ARRANGEMENT FOR SUBMERGED ARC WELDING

George G. Landis, South Euclid, and Harold S. Payne, Cleveland Heights, Ohio, assignors to The Lincoln Electric Company, Cleveland, Ohio, a corporation of Ohio Application July 16, 1953, Serial No. 370,896

2 Claims. (Cl. 219—73)

This invention pertains to the art of electric arc welding of the submerged arc type and, more particularly, to an improved flux hopper arrangement.

The invention is particularly applicable to arc-welding apparatus of the semiportable type wherein a portable welding head, including an electrode nozzle and flux hopper, is provided and a continuous bare, electrically energized electrode wire is fed into a pile of granular flux deposited from the hopper on the workpiece to maintain an arc with the workpiece and effect a weld deposit thereon and the invention will be described with particular reference to such apparatus, although it will be appreciated, upon a reading and understanding of this application, that the invention has broader applications such as, without limitation, fully automatic welding apparatus or the like.

In some respects, the present invention is an improvement on our copending patent application Serial No. 319,906, filed November 12, 1952, and entitled Method and Apparatus for Submerged Arc Welding. In that application, a generally closed flux hopper is described in combination with a vacuum source or pump which, when operating, will cause a stream of air to flow into the flux hopper through a flux passage in the lower end of the hopper. This stream of air enables the hopper to be readily filled by placing the flux passage into a source of bulk flux and the flux is sucked into the hopper. When it is desired to deposit flux upon a workpiece, the vacuum source is turned off to stop the flow of air whereby the flux may readily flow out of the flux passage.

In apparatus constructed in accordance with the disclosure of that application, some difficulty has been experienced with what may be termed the carryover of flux to the vacuum source, even though steps were taken to reduce the velocity of the air as it leaves the flux hopper so as to presumably be insufficient to carry with it any air-borne flux. In addition, this application described the use of a fine mesh screen between the hopper and vacuum source to prevent the passage of any fines or extra small flux particles. With this arrangement, there was a tendency for the particles to plug up the openings of the fine mesh screen and block the flow of air.

The present invention contemplates apparatus of the type referred to which overcomes the above referred to problems and others and provides a flux-hopper arrangement which is simple in construction and simple in operation.

In accordance with the invention, a generally closed flux hopper is provided having a pair of passages leading outwardly therefrom, one communicating the lower part of the hopper with a flux nozzle for directing the flux onto the workpiece and the second communicating the upper part of the hopper with said nozzle. In addition, the upper part of the hopper has a passage leading to a vacuum source or pump which, when the pump operates, causes a flow of air inwardly to the hopper, through the nozzle and the two passages. This flow of air is used to suck flux into the hopper so that the hopper may readily be filled or to retain the flux in the hopper during periods of no welding. When this flow of air is cut off either by turning off the vacuum source, providing a bleed passage or blocking the passage to the flux hopper, the flux can flow by gravity out of the hopper, through the first passage into the nozzle and onto the workpiece to be welded.

When filling the hopper, the flux particles entrained in the air stream first flow through both passages into the hopper until the hopper becomes partly filled when the flux particles, under the influence of gravity, tend to settle on the bottom of the hopper and plug up the first passage. Then, except for a slight bleeding of the air through the settled flux particles, the major air flow and flux flow is through the second passage into the upper part of the hopper. Here, because of the much greater cross-sectional area of the air path, the air stream loses much or all of its velocity, depending upon the change in the cross-sectional area, and drops the entrained flux onto the top of the flux already in the hopper. The air stream then passes outwardly from the hopper to the vacuum source and thence back into the atmosphere.

The first passage is generally of a limited area such as to limit the rate of particles flowing therethrough during the time that the flux hopper is being filled but, regardless of this area, any flux which does fall through the first passage falls into the nozzle and is picked up by the air stream and carried back into the hopper through the second passage. Normally, the slight flow of air through this first passage caused by the leakage of air through the loose flux in the hopper will prevent the flow of flux outwardly through this first passage.

Valve means may be provided for closing this first passage when the flux hopper is being filled or between welding operations to prevent this leakage of flux through the first passage, should it occur. These valve means may be so constructed and arranged as to operate or close automatically in response to the flow of air into the hopper or by means of electrical controls or in response to movement of the electrode wire or open in a like manner or a manually operated valve may be provided or a combination of both.

The air stream, as it enters the hopper from the second passage, is considerably reduced in velocity because of the greater cross-sectional area through which the air passes. If a hopper of extremely large volume were provided, this air velocity would be reduced to very low values and completely insufficient to entrain any flux particles and carry them out of the hopper and over to the vacuum source. Thus, all of the flux brought to the second passage would drop onto the top of the flux pile in the hopper.

The invention, however, is particularly adapted where, because of bulk problems, the hopper must have a limited cross-sectional area such that the air velocity may not be reduced to desired amounts or the air outlet of the hopper must be generally directly over or aligned with the outlet of the second passage. The flux particles leaving the second passage have a considerable velocity and would be easily carried along by the reduced velocity air stream to the air outlet of the flux hopper.

Thus, the present invention also contemplates that the outlet of the second passage be so constructed and arranged that all of the flux particles as they leave the second passage are moving in a direction toward the top of the flux pile; that is, in a direction opposite to that of the air leaving the flux hopper. Thus, in order for a flux particle to be carried out of the air outlet of the hopper, it is necessary for the velocity of the air stream to not only decelerate the velocity of the flux particles toward the flux pile but to accelerate them in the opposite direction and then carry them through the air outlet. By so directing the motion of the flux particles as they leave the second passage, it is practically impossible for them to have their direction reversed and flow out of the hopper with the air stream.

The invention also contemplates means of large cross-sectional area in the air-outlet passage of the flux hopper to reduce the velocity of the air flow at that point in combination with multiple baffle means as distinguished from a filter or screen for removing the velocity of any flux particle which might be carried thereinto so as to make it more difficult for the reduced air velocity to carry the flux particle with it.

The outlet of the second passage into the flux hopper is so arranged and constructed that once the flux hopper has been completely filled, the flow of air through the second passage will automatically be so reduced as to prevent the further flow of flux into the second passage.

The invention also contemplates apparatus whereby the hopper may be continuously filled during a welding operation whereby the operation need not be periodically interrupted in order to fill the flux hopper. Means in the form of a passage from the upper part of the hopper to an auxiliary supply of flux are provided, together with means for otherwise blocking off or dispensing with other air-entrance passages into the hopper. Such passage may alternatively or jointly be employed to pick up used flux after the welding operation.

The principal object of the invention is the provision of a new and improved flux-hopper arrangement which is simple in construction, simple in operation, which enables a flux hopper to be filled with a maximum ease, which enables the ready control of the influx and efflux of flux into the hopper and which prevents the movement of flux to the vacuum source.

Another object of the invention is the provision of a new and improved flux hopper having a flux nozzle on the lower side thereof and a pair of passages, one communicating the lower end of the hopper with the nozzle and the other communicating the upper end of the hopper with the nozzle, whereby flux may be readily sucked into the flux hopper and retained therein between welding operations and, yet, readily discharged onto a workpiece when it is desired to perform a welding operation.

Another object of the invention is the provision of new and improved means for sucking flux into a flux hopper so constructed and arranged that the particles entering the hopper have a direction of movement at an angle away from the path of sucking air leaving the hopper.

Still another object of the invention is the provision of new and improved means for preventing the movement of flux particles to a vacuum source comprising means for reducing the velocity of the air stream by increasing the area in which it is flowing in combination with baffle means having relatively large passages therethrough so constructed and arranged that no particle can pass therethrough without impinging somewhere on the baffle to lose its velocity and be removed from the air stream.

Still another object of the invention is the provision of a new and improved flux-hopper arrangement having actuatable valve means at the lower end thereof to control the flow of flux thereout in combination with means for sucking flux into the hopper and depositing it on the top of the flux in the hopper.

The invention may be comprised in certain parts and arrangement of parts, preferred embodiments of which will be described in detail in this specification and illustrated in the accompanying drawings which are a part hereof, and wherein:

Figure 1 shows a side cross-sectional view somewhat schematically of a flux-hopper arrangement illustrating one possible embodiment of the invention;

Figure 2 is a view similar to Figure 1 but showing an alternative embodiment of the invention;

Figures 3 to 9 all show alternative valving arrangements for controlling the flow of flux from the hopper;

Figures 3a to 8a all show bottom upwardly-looking, cross-sectional views of the respectively numbered figures taken approximately on the cross-sectional lines shown and correspondingly numbered;

Figure 10 shows a still further alternative arrangement whereby the invention may be employed to pick up flux after a welding operation has been completed;

Figure 11 shows a still further alternative embodiment of the invention whereby flux from an external source may be continuously supplied to the flux hopper during the course of a welding operation; and Figures 12, 13 and 14 are views showing the best mode contemplated for carrying out the present invention.

Referring now to the drawings wherein the showings are for the purposes of illustration only and not for the purposes of limiting the invention, Figure 1 shows a closed flux hopper 10 intended to hold granular welding flux prior to a welding operation and from which such flux is flowed in a pile onto a seam to be arc welded just prior to the actual arc welding thereof.

As is well known, this flux fuses in the presence of the heat of the electric arc and provides a protective blanket to exclude air and other detrimental elements from the weld seam until the weld metal has congealed and cooled. This molten flux floats on top of the molten metal and congeals at some time after the congealing of the metal.

By a closed flux hopper is meant a hopper which is completely imperforate to the outside, except for certain passages to be hereinafter discussed. If the hopper is provided with a cover, this cover should preferably fit tightly thereon so as to prevent the passage of any air past the seal.

The shape of the flux hopper is immaterial insofar as the present invention is concerned. Figure 1 shows a flux hopper having a relatively large horizontal cross section with tapering base walls 12 to the lower end thereof. The hopper shown in Figure 1 generally has a large flux capacity but, because of its bulk and weight, will normally be found on automatic welding apparatus wherein heavy, rigid supports can be provided for the hopper and welding head.

Figure 2, on the other hand, shows a flux hopper which has a much smaller horizontal cross section and the hopper is generally round and elongated in a vertical direction such that a sufficient supply of flux can be held therein. The hopper shown in Figure 2 is generally intended for what may be termed automatic hand welding wherein a flux and bare wire electrode are continuously fed toward the workpiece to be welded but the apparatus, or at least the welding end thereof, may be moved around manually relative to the workpiece so as to follow the weld seam.

Each hopper, whether it be that shown in Figure 1 or Figure 2, has a first passage 15 leading away from an upper portion of the hopper to a vacuum source 16 which may either be located immediately at the hopper or remote therefrom, it being preferred that the vacuum source which is preferably in the form of a centrifugal blower or pump be located remotely from the flux hopper 10 and connected thereto by a relatively long passage 15.

The vacuum source 16 tends to remove air from the inside of the hopper 10 and lowering the air pressure therein so that outside air will tend to rush or be sucked into the interior of the hopper 10 through any other passages communicating the exterior of the hopper with the interior. As will be seen, such passages or openings are provided.

A butterfly valve 17 which may be manually operated or electrically operated by means of a solenoid magnet 18 is positioned in the passage 15 between the vacuum source 16 and the flux hopper 10, which butterfly valve controls the application of the vacuum to the hopper, depending upon whether it is open or shut. Obviously, by controlling its degree of opening, the amount of vacuum in the hopper 10 can also be controlled. Other means for controlling the application of the vacuum may also be provided, including, without limitation, turning on and off the power source for the vacuum source 16, blocking its outlet or bleeding air into its inlet. The particular control of this vacuum source, however, forms no part of the present invention and is described herein simply for the purposes of illustration.

The flux hopper 10 has a second passage 20 at or adjacent a lower portion thereof and preferably in the bottom end 21 of the hopper through which the granular flux may pass to be deposited onto a workpiece. In all of the embodiments, only one passage 20 is shown. Obviously, any number may be provided. Also, the passage 20 in Figure 1 is shown as having straight or cylindrical side walls. To facilitate the flow of flux therethrough, these side walls may taper outwardly in an upward direction.

In the preferred embodiment of the invention, the second passage 20 opens into a second chamber 23 having a restricted lower opening 24, the container for this chamber and opening being conveniently termed a flux nozzle 25.

This flux nozzle 25 may be made of the same material as is the flux hopper 10 and may be integral therewith. In this case, the lower end 21 forms a dividing line between the lower end of the hopper 10 and the flux nozzle 25 with the passage 20 intercommunicating the interior of the hopper and the second chamber 23.

A third passage 30 communicates the upper end of the hopper with the second chamber 23 and, in the embodiment shown, is formed by a long hollow member or tube 31 on the inside of the hopper 10 and opening at its lower end through an opening in the bottom 21 into the chamber 23 and opening at its upper end into the interior of the hopper 10. This member 31 may be made of rubber or metal or the like, depending upon whether flexibility is required or not. In Figure 1, the member 30 could be of rigid material while in Figure 2 the member 31 is preferably of a flexible or resilient material.

This is so because, in Figure 1, the hopper 10 will preferably be formed from a rigid material while the hopper of Figure 2 will preferably be formed from a long flexible tube or the like.

In operation, the vacuum source 16 lowers the air pressure on the interior of the hopper 10. The outside air is thus sucked into and rushes into the hopper through both passages 20 and 30 to replenish the air removed by the pump 16.

If the lower end of the flux nozzle 25 is then placed in a container of granular, bulk flux, the particles will be sucked up by the rapid air flow and carried into the interior of the hopper 10. In this respect, it is to be noted that the passages 20, 30, the chamber 23 and the opening 24 all have a relative restricted cross-sectional area such that there will be a relatively high air velocity therethrough, which air velocity is sufficient to carry with it the granular flux particles.

As the flux particles are carried into the interior of the hopper 10, it will be noted that the cross-sectional area of the air passage increases so that the flux particles are dropped by the air stream and fall into the bottom of the hopper. The flux particles settle in the bottom of the hopper and very quickly block or plug up the first passage 20. Thereafter, the air, carrying with it the flux particles, passes through the third passage 30 to the top of the flux hopper where the flux particles then fall onto the top of the flux pile in the hopper.

As this operation continues, it has been found that some air will continue to bleed through the second passage 20 and between the piled flux particles, which restricted passage of air tends to prevent or at least limit the flux already piled in the hopper from passing downwardly through the second passage 20 under the force of gravity. However, some particles will bleed downwardly through this second passage, but they are immediately picked up by the air stream in the chamber 23 and carried back into the hopper through the passage 30.

In Figures 1 and 2, a movement of the flux particles alone is shown by the dotted lines while the movement of the air is shown by the solid lines. The combined movement of air and flux particles is shown by the dotted and dashed lines.

After the hopper has been filled, the flux nozzle 25 may be removed from the supply of bulk flux, but the vacuum source 16 continues to operate with a continued flow of air into the hopper through the third passage 30. Any flux which might fall through the second passage 20 is immediately picked up and carried back into the hopper by the moving air.

When it is desired to weld, the vacuum source 16 is cut off from the hopper 10 by the means shown and the air flow stops so that the flux may flow downwardly through the second passage 20 into the chamber 23, thence through the opening 24 onto the workpiece to be welded.

In Figure 1, the upper outlet of the passage 30 is substantially removed from the inlet to the first passage 15. Also, the hopper 10 has a considerable cross-sectional area through which the air must flow. Thus, the air velocity will be relatively low in moving between these two passages and insufficient to carry with it any of the entrained flux or at least to be able to accelerate the flux particles from a position of rest or from a direction of movement away from the passage 15 so as to move it into this passage. It is preferred that means be provided to insure that the flux particles have a component of velocity as they, in effect, leave the outlet of the passage 30 which is at an angle away from the inlet to the passage 15. In the embodiment shown in Figure 1, a baffle 33 extends from the upper side of the hopper 10 downwardly between the outlet of the passage 30 and the inlet to the passage 15. Thus, the flux particles, as they, in effect, leave the passage 30, are moving downwardly away from the passage 15 and, because of their mass, continue to move downwardly after having passed the lower limits of this baffle 33. The air, however, having a much lower mass, is easily able to change its course to pass outwardly through the passage 15. An effective separation of the flux particles from the moving air results.

In Figure 2, however, the flux hopper has a much smaller cross-sectional area so that it is difficult to substantially reduce the velocity of the air to insure that it will drop its flux particles. Also, it will be noted that the inlet to the passage 15 is substantially directly aligned with the outlet of the passage 30. Thus, in Figure 2, the upper end of the member 31 has a baffle in the form of an inverted cup-shaped member 35 of a greater diameter than the external diameter of the member 31 and with the sides 36 of the cup extending over the end of the member 31 in overlapping relationship. This cup 35, in effect, forms a continuation of the passage 30 which opens in a downward direction; that is, in a direction away from the inlet to the passage 15. The combined flux and air flow are thus moving in a downward direction as they leave the passage 30.

In the embodiment shown in Figure 2, the skirts 36 have a baffle arrangement in the form of a screen 37 serving as an extension thereof, which baffle permits the air to reverse its direction of movement and move to the passage 15 but impedes the passage of the flux particles and forces them to continue their downward movement to the top of the flux pile in the hopper. This screen 37 preferably has relatively large openings therein in relation to the size of the flux particles, the purpose of these large-size openings being to prevent any flux particles from becoming lodged or stuck in the openings which would interfere with the over-all operation of the apparatus if a large number of these openings should become plugged.

The cup 35 may be so shaped and formed as to have a minimum impact effect of the flux particles on its bottom in the course of redirecting the path of movement of these flux particles. This may be done by providing the base of the cup 35 with a resilient cushion or the like or the bottom may be suitably shaped such that the particles instead of striking the surface at right angles to their line of movement, do so at an acute angle and instead of rebounding, are deflected in a gradual manner to have their direction of movement reversed to move toward the top of the pile of flux in the hopper. The particles will thus have a higher velocity in this latter direction than if they were allowed to impinge upon a flat surface of a cup with a flat bottom.

In the embodiment of the invention shown in Figures 1 and 2, a filter chamber 40 is provided between the hopper 10 and the inlet to the first passage 15. This chamber 40 is in the form of a tubular portion of enlarged cross-sectional diameter to reduce the air velocity therethrough to an amount insufficient to pick up a flux particle which it at rest in this portion. In other words, the air velocity to the portion 40 may be sufficient to carry with it a flux particle which is already moving with the air stream as it enters the portion 40; but if this flux particle were suspended in the portion 40 by some means or other, the air velocity would be insufficient to pick the particle up and carry it along into the inlet of the passage 15 which is normally of a smaller diameter and thus has a high air velocity therethrough. Obviously, if the flux hopper 10 of Figure 2 were of a large diameter, the portion 40 would then simply be a continuation of the hopper 10 or it could be smaller in size.

Baffles are placed in the chamber 40, the purpose of which is to bring any particle which might be moving with the air stream to a stop such that the particle cannot be then carried upwardly with the air stream. In the embodiment of the invention shown, the baffles are in the form of a plurality of screens 42 in spaced relationship extending completely across the interior of the chamber 40. These screens may be woven of wire or the like or may be made of perforated sheets. In either event, the openings through the screens should be of a size greater than the largest sized flux particle which will be employed. The various screens are arranged as shown, one above the other, so that there is no straight path through the various poles; that is to say, the holes are so staggered from one screen to the next that a flux particle, being carried upwardly by the air stream, will be assured of striking the metal between the holes of one of the screens and thereby lose its upward velocity. When the particle has lost its upward velocity, it will, of course, drop downwardly onto the top of the flux pile in the hopper 10. While only three screens 42 are shown, obviously more could be employed.

In each of Figures 1 and 2, no electrode nor the means for feeding the electrode to the workpiece are shown. These are conventional and the electrode may be either fed down through the hopper and flux nozzle as is conventional or may be fed externally thereof.

In the above described embodiments of Figures 1 and 2, the second passage 20 is shown as being continuously open. During the filling of the flux hopper or between the welding operations when the air is being drawn inwardly through the flux nozzle, some flux will generally leak or bleed through the passage 20. This flux is, as pointed out above, immediately picked up and carried through the passage 30 back into the flux hopper. However, because of this bleeding, there will be generally a continuous circulation of flux which has a tendency, because of the impacting of the flux particles on each other and on the sides of the flux hopper, to break the particles into smaller sizes and produce fines; that is to say, particles of such a small size that they will remain suspended in moving air and carried outwardly through the passage 15.

In the embodiments of the invention shown in Figures 3 to 9, valve means are provided for closing off the second passage 20. Figures 3 and 3a show a preferred embodiment of such a valve means. In Figure 3, a valve member in the form of a ball 45 having a diameter greater than the diameter of the passage 20 is supported by brackets 46 in a position just below the lower openings of the passage 20. This ball is preferably formed of a relatively light material and the bracket 46 supports it in close enough proximity to the passage 20 such that any air movement inwardly through the passage 20 will pick the ball 45 up and hold it in sealing engagement with the lower edge of the passage 20. The ball 45 in this position effectively prevents any flux from dropping outwardly through the passage 20 as long as the vacuum is maintained in the hopper 10. It will be appreciated that the flux material being granular will always allow some air to bleed through the flux piled in the hopper and this slight bleeding of air is sufficient to actuate the ball 45 and hold it in its sealing position. It will be appreciated that the passage 30 has sufficient resistance to the passage of air that there will be a sufficient vacuum on the interior of the hopper 10 to hold this ball in its sealing position.

Figure 4 shows a mechanically actuated valve means in the form of a valve plate 48 pivoted on the lower side of the member 21 and having an opening 49 which may be pivoted into and out of registration with the passage 20. The plate 48 is shown as having an operating handle 47 extending through a horizontal slot 50 in the side of the flux nozzle 25 just below the end 21. This valve plate 48 may be operated manually, electrically or otherwise. In a like manner, the operation of the valve 48 may be associated with electrical contacts such that when the opening 49 is brought into alignment with the passage 20, a switch will be operated which will otherwise start the welding apparatus in operation.

Figure 5 shows a still further alternative form of valve mechanism including a valve plate 52 mounted for pivoting about a horizontal axis in the sides of the flux nozzle 25 and having a handle 53 on the outside of the hopper. The operation of the handle 53 pivots the valve plate 52 in a manner as shown by the dotted lines to open the passage 20 and allow the flux to flow into the chamber 23 and thence onto the workpiece. If desired, spring means 54 may be provided for biasing the valve plate 52 to the closed position. The handle 53 may be manually operated or by suitable electric means if desired. Additionally, the small amount of air bleeding upwardly through the passage 20 when the butterfly valve 17 is open can be employed to move the plate 52 into the closed position. In a like manner, means can be provided associated with the flow of air into the passage 30 for moving the plate 52 into the closed position.

Figure 6 shows a still further modified embodiment of the invention wherein the movement of the electrode wire for performing the welding operation is employed for opening and closing the passage 20. Thus, in the embodiment shown in Figure 6, the electrode 60 is shown issuing forth from a flexible conduit 61 through the plate 21 and thence out of the lower end of the flux nozzle 25. A plate 62 is shown as pivoted on the lower side of the base 21 and extending across the lower side of the passage 20. The plate 62 has an oblong opening 63 therein through which the electrode 60 passes in frictional engagement therewith. As the electrode 60 is fed downwardly out of the conduit 61, it frictionally engages the plate 62 to move it away from the passage 20 to allow the flux to fall therethrough. A spring (not shown) may be employed to bias this member 62 to the closed position or the movement in the feeding direction of the electrode 60 may be employed to open the valve plate 62 and the pullback movement of the electrode 60 after the welding operation has been completed may be employed to close this valve. For suitable control mechanism which will cause the electrode 60 to be pulled back into the conduit 61 when a welding operation has been completed, reference is made to the copending application of George G. Landis and Harold S. Payne, Serial No. 342,192, filed March 13, 1953.

Figure 7 shows a still further alternative embodiment of the invention. The lower end 69 of the hopper has only a single opening 70 with which the passage 30 is aligned, with the lower end of the member 31 being spaced from the upper side of the base 69, thus providing a passage 72 into the lower portion of the flux hopper 10. In effect, the space 72 forms the second passage, which second passage 72 merges with the passage 30 into the opening 70 in the end 69. Any flux which may tend to fall through the second passage 72 will be immediately picked up by the air moving into the passage 30 and drawn back into the hopper as previously described. When the flow of air is stopped, however, the flux can pass through the second passage 72 into the chamber 23 of the flux nozzle 25 and thence onto the workpiece. In the embodiment of the invention shown in Figure 7, the base 69 is made vertically movable and a handle 75 is shown extending to the outside of the flux nozzle 25 so that the base or end 69 can be raised vertically to close the passage 72 and prevent the movement of flux into the opening 70. Obviously, other means may be employed for moving the member 69 vertically so as to close the passage 72, including electrode means or pneumatic means.

Figure 8 shows one form of a pneumatic means constructed in accordance with the present invention. In this embodiment of the invention, the end 69, instead of being rigid, is formed from a flexible diaphragm 76 mounted at its edges on the hopper 10 and having a central opening 77. This diaphragm in its normal position will be spaced from the lower end of the member 31 to thus provide the second passage 78. In this embodiment of the invention, the opening 77 is preferably made smaller than the passage 30 in the member 31 so that as air is sucked into the passage 30, a force will be exerted on the diaphragm 76 to pull it upwardly into abutting engagement with the lower end of the member 31 and thus close the passage 78.

In both the embodiments shown in Figures 7 and 8, the passages 70 and 77 respectively have been shown as centrally located relative to the hopper. Obviously, they can be disposed to one side thereof if desired.

Figure 9 shows a still further alternative embodiment wherein the lower side 80 of the hopper 10 also forms the flux nozzle. In this embodiment, the base 80 has a passage 81 aligned with the passage 30 in the member 31 and preferably of slightly smaller diameter. The upper surfaces of the end 80 are normally spaced from the lower end of the member 31 to thus form the second passage 83 therebetween through which the flux can flow from the hopper through the opening 81 onto the workpiece. The base 80, however, is made vertically movable such that either when air is flowing inwardly through the passage 31 or when some mechanical means are operated, the passage 83 will be closed to prevent the flow of flux into the passage 81. One feature of this particular construction is that if the lower end of the flux nozzle is allowed to rest on a horizontal surface, the weight of the flux hopper will tend to close the passage 83. Thus, the vacuum source 16 may be turned off for the night without having the flux in the hopper 10 spill out onto the floor or otherwise.

Figure 10 shows a still further alternative arrangement of the invention wherein arrangement is made such that the flux deposited on the weld seam will be picked up as the welding head moves along and after the weld has been completed and returned to the hopper 10. In this embodiment of the invention, the passage 30 has an auxiliary or branch passage 30' extending to a point spaced from the welding operation but in line with the welding seam. A valve is provided for closing off the portion of the passage 30 which communicates with the chamber 23 so that all of the air will flow inwardly through the passage 30', thence into the passage 30 into the flux hopper 10. The air flowing into the passage 30' will pick up any loose flux not used in the welding operation and return it to the flux hopper. It will be noted that in this embodiment of the invention, the member 31 forming the passage 30 extends exteriorly of the hopper 10 to where it communicates with the chamber 23.

When it is desired to stop a welding operation, a valve 85 is actuated to communicate the passage 30 with the chamber 23. Thus, any flux in the chamber 23 will be sucked back up into the flux hopper 10. The chamber 23 will be immediately cleared without further flux falling onto the workpiece. Obviously, valve means could be provided on the passage 20 of this embodiment.

Figure 11 shows an arrangement whereby the flux in the hopper 10 may be continually replenished as it is used during a welding operation. In this embodiment of the invention which is much similar to that shown in Figure 2, a bulk supply of flux 90 is shown remote from the welding head. A tube 91 having an end 92 resting upon the surface of the flux in the supply 90 communicates with the flux hopper 10. In this embodiment of the invention, the member 91 extends interiorly of the member forming the passage 15. A butterfly valve 93 is provided in this member 91 for closing off the flow of air and flux therethrough. The butterfly valve 93 is shown as open in this embodiment.

A butterfly valve 94 is also shown provided in the flux passage 30, in this instance the valve 94 being in the closed position. The electrode wire 60 is shown as being fed from a reel 96 by a pair of motor-driven pinch rolls 97 through the flexible conduits 61 and out of the flux nozzle 25. Flux is passing through the passage 20 through the flux nozzle onto the workpiece. Because the butterfly valve 94 is closed and the butterfly valve 93 is open, air and flux are being sucked into the flux hopper 10 through the member 91, the flux being deposited on the top of the flux already in the hopper 10 while the air reverses itself and passes outwardly of the flux hopper through the passage 15.

In this embodiment of the invention, the valve means shown in Figure 6 for opening and closing the passage 20 are employed. Obviously, other means could be used in a like manner.

The above described embodiments illustrate principles of the invention by which one skilled in the art can readily construct flux-hopper arrangements embodying the present invention. Figures 12, 13, and 14 show the best mode contemplated for carrying out the present invention. In this embodiment, the flux hopper 10 is comprised of a long flexible tube made up of fabric 100 having a helical steel coil 101 which prevents the fabric from collapsing. The lower end of this flexible tube terminates in a rigid sleeve 103 preferably of nonmetallic material which slips into the lower end of the flexible tube. The lower end of the sleeve 103 terminates in an inwardly tapering portion 104 and a short cylindrical section 105, the portions 104 and 105 generally forming the flux nozzle referred to with reference to the embodiments of Figures 1 to 11. A barrier 106 extends across the interior of the tube 103, forming, in effect, the lower end of the flux hopper 10. This barrier 106 has a passage 107 therein corresponding to the second passage 20 referred to in the above embodiments. A ball 108 having a diameter greater than the diameter of the passage 107 is supported below the lower end of the passage 107 by a metal bracket 109, the function of which ball is to close the lower end of the passage 107 when air is moving inwardly to the flux hopper 10. This ball 108 is preferably formed of any light material such as wood, plastic or the like. It can be either hollow or solid. In a like manner, the flexible conduit 61 for guiding the electrode 60 toward the workpiece extends vertically through the hopper 10 through a passage centrally located in the member 106 and terminates just therebelow. The electrode 60 feeds from this conduit 61 toward the workpiece. In the embodiment of the invention shown, the lower end of the conduit cooperates with the bracket 109 to hold the ball 108 always in position adjacent to the passage 107 so that movement of air through the passage 107 can quickly pull the ball 108 into closing relationship with the passage 107.

The passage 30 in this embodiment of the invention is formed by a metallic tube 110 extending into an opening in the member 106 and extending upwardly therefrom wherein a long flexible tube 111 forms an extension thereof vertically upwardly through the flux hopper 10. The upper end of the tube 111 again terminates in a metallic tube 112 having mounted on its upper end an inverted metallic cup 113 having a diameter greater than the diameter of the tube 112 and with its side walls extending in overlapping relationship with the upper end of the tube 112. A cylindrical screen 114 in turn forms an extension of the side walls of the cup 113 along the sides of the tube 114. This screen in turn terminates in a tube of like diameter 115 fixed to the walls of the hopper 10. The screen 114 has, in accordance with the invention, a plurality of openings therethrough of a size greater than the largest sized flux particle.

The upper end of the flux hopper 10 is formed by the filter chamber 40 which, in the embodiment shown, is comprised of a metallic tube 120 of a diameter substantially greater than that of the tube 100 and tapering at its lower end as at 121 to the diameter of the tube 100. As shown, the upper end of the tube 112 extends into this filter chamber.

The baffles in the filter chamber 40 are comprised of a plurality of screens 125 each with relatively large openings therethrough firmly mounted in the tube 120. These screens are held in spaced assembled relationship by bolts extending therethrough with spacing washers mounted thereon.

At one point in the screens, they are cut away as at 128 to provide a passage for the conduit 61 and preferably a packing material 129 is provided around the conduit 61 to prevent passage of any flux thereby. This packing need not be of particularly strong sealing construction because there is little pressure differential thereacross because of the free flow characteristics through the screens 125.

These screens 125 are so mounted relative to each other that the material of one is opposite the hole of another; that is to say, the holes are in staggered relationship to insure that any flux particle moving thereagainst will be sure to impinge on the screen and fall back out of the air stream therethrough.

The upper end of the tube 120 terminates in an inwardly tapering portion 135 which fits into a flexible tube 136 of similar construction to the tube forming the flux hopper 10. This tube 136 continues for a short distance to a swivel joint 138 and thence through an additional length of flexible tube 137 to the vacuum pump shown schematically at 16. The butterfly valve is shown as imposed in the tube 137 adjacent to the pump 16.

The swivel 138 enables the entire flux hopper to be turned freely relative to the tube 137 which is particularly of importance if a tractor member is to be employed for advancing the welding electrode along a workpiece. Such a tractor is not shown but is illustrated in the copending application of Harold S. Payne, Serial No. 357,051, filed May 25, 1953.

It will be seen in this embodiment of the invention that there are no sharp lines of demarcation from the interior of the flux hopper to the flux nozzle or from the flux hopper to the pump 16 but that each may gradually blend, one into the other. The important thing is that the flux hopper has a restricted opening through which flux can flow outwardly under the force of gravity onto a workpiece to be welded, a second passage leading from a point generally close to the first passage to a point toward the upper end of the flux hopper and a third passage leading from the flux hopper to a vacuum pump or vacuum source by which air can be made to flow inwardly through the first two mentioned passages.

In the operation of the flux-hopper arrangement shown in Figure 12, it has been found that the hopper will fill approximately to the lower edge of the cup 113. Any further flux flow into the hopper tends to so restrict the air flow through the tubes 110 and 111 as to be insufficient to further carry flux into the hopper. In other words, when the flux hopper 10 becomes filled to the point just indicated, further intake of flux is stopped. At this point if the ball 108 has not been previously pulled into closing engagement with the passage 107, this action will take place because as the flow through the tubes 110 and 111 is restricted, a greater amount of air will bleed through the flux hopper itself and the passage 107.

It has further been found in operation that because of the large holes in the screens 125, there is no tendency for this type of filter to plug up and prevent the free flow of air therethrough.

In accordance with the patent laws, preferred embodiments of the invention have been described in sufficient detail to enable one skilled in the art to readily understand the invention. It will be appreciated that other embodiments differing radically in appearance from those described in detail herein will occur to others upon a reading and understanding of this specification. It is our intention to include all such alterations insofar as they come within the scope of the appended claims.

Having thus described our invention, we claim:

1. In electric arc welding apparatus a closed flux hopper, having a passage at the lower end thereof, through which granulated flux is adapted to flow and be deposited on a workpiece, valve means in said passage for controlling the flow of flux therethrough, means for optionally feeding an electrode toward a workpiece and means operatively associated with the feeding of the electrode toward the workpiece to open said valve means.

2. Electric arc welding apparatus comprising, in combination: means for optionally feeding an electrode toward a workpiece and for drawing the electrode back at the end of a weld, a flux hopper having a flux discharge opening through which granular flux is adapted to be flowed onto a workpiece, valve means for said opening for controlling the flow of flux therethrough and means inter-relating the feeding and drawing back of the electrode for opening said valve means when the electrode is fed toward the workpiece and closing said valve means when the electrode is pulled back.

References Cited in the file of this patent

UNITED STATES PATENTS

| | | |
|---|---|---|
| 727,030 | Tilghman | May 5, 1903 |
| 2,367,257 | Baird | Jan. 16, 1945 |
| 2,390,560 | Stanley et al. | Dec. 11, 1945 |
| 2,431,544 | Dittrich | Nov. 20, 1947 |
| 2,666,731 | Bergstrom | Jan. 19, 1954 |